United States Patent
Toksoz et al.

(10) Patent No.: US 9,846,564 B1
(45) Date of Patent: Dec. 19, 2017

(54) MESH NETWORK OF NEARBY MOBILE DEVICES AS A COMBINED SPEAKER SYSTEM FOR AUDIO

(71) Applicant: Google Inc., Mountain View, CA (US)

(72) Inventors: Tuna Toksoz, Mountain View, CA (US); Thomas Price, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 15/188,488

(22) Filed: Jun. 21, 2016

(51) Int. Cl.
| | |
|---|---|
| *H04R 3/00* | (2006.01) |
| *G06F 3/16* | (2006.01) |
| *H04R 3/12* | (2006.01) |
| *H04W 4/00* | (2009.01) |
| *H04W 4/02* | (2009.01) |
| *H04W 56/00* | (2009.01) |

(52) U.S. Cl.
CPC ............. *G06F 3/165* (2013.01); *H04R 3/12* (2013.01); *H04W 4/003* (2013.01); *H04W 4/023* (2013.01); *H04W 56/002* (2013.01)

(58) Field of Classification Search
CPC ........ G06F 3/165; H04R 3/12; H04W 56/002; H04W 4/003; H04W 4/023
See application file for complete search history.

(56) References Cited

U.S. PATENT DOCUMENTS

| | | |
|---|---|---|
| 2013/0173761 A1 | 7/2013 | Griffiths |
| 2014/0093085 A1* | 4/2014 | Jarvis .................... H04R 27/00 381/17 |
| 2015/0094834 A1 | 4/2015 | Vega |
| 2015/0095774 A1 | 4/2015 | Bates |
| 2015/0200923 A1 | 7/2015 | Triplett |
| 2016/0014514 A1* | 1/2016 | Triplett ............ H04N 21/23406 381/77 |
| 2017/0094437 A1* | 3/2017 | Kadri ....................... H04R 5/02 |

OTHER PUBLICATIONS

"AmpMe—Turn Your Friends Into a Portable Sound System", http://ampme.com/, [retrieved from the internet on Jun. 21, 2016], 2 pages.
"Spotify Connect", https://www.spotify.com/us/connect/, [retrieved from the Internet on Jun. 21, 2016], 7 pages.
PCT Notification of Transmittal of the International Search Report and the Written Opinion of the International Searching Authority for PCT Application No. PCT/US2016/069180, dated May 16, 2017, 48 pages.

* cited by examiner

*Primary Examiner* — Muhammad N Edun
(74) *Attorney, Agent, or Firm* — Lowenstein Sandler LLP (57) ABSTRACT

Implementations disclose a mesh network of nearby mobile devices as a combined speaker system for audio. A method includes detecting one or more other computing devices within a geographic vicinity of a computing device, transmitting a confirmation to join a speaker mesh network with the detected one or more other computing devices, receiving a playback synchronization instruction for a media item, adjusting playback of the media item according to the playback synchronization instruction, wherein the one or more other computing devices in the speaker mesh network provide synchronized playback of the media item according to the playback synchronization instruction, receiving a stereo sound and audio equalization instruction, and applying, according to the stereo sound and audio equalization instruction, stereo sound and audio equalization settings to the playback of the media item at the computing device.

24 Claims, 8 Drawing Sheets

MESH NETWORK OF NEARBY MOBILE DEVICES AS A COMBINED SPEAKER SYSTEM FOR AUDIO

TECHNICAL FIELD

This disclosure relates to the field of content sharing platforms and, in particular, to a mesh network of nearby mobile devices as a combined speaker system for audio.

BACKGROUND

Content-sharing platforms and their corresponding websites and mobile applications ("apps") allow users to play and watch music and videos. Users often find themselves in situations where they would like to play music or watch content, but do not have an established speaker setup to utilize. For example, a user may prefer to listen to music or watch content while at a picnic in the park, a BBQ in the back yard, and so on. Multi-speaker systems are advanced and provide high-quality audio, but many users have not invested in these types of systems. Furthermore, these types of systems are usually kept at home. For occasions outside of the house, or even in different rooms of the house, videos are often watched on a mobile device with a single mobile phone speaker that does not provide high-quality audio output.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes detecting one or more other computing devices within a geographic vicinity of a computing device, transmitting a confirmation to join a speaker mesh network with the detected one or more other computing devices, receiving a playback synchronization instruction for a media item, adjusting playback of the media item according to the playback synchronization instruction, wherein the one or more other computing devices in the speaker mesh network provide synchronized playback of the media item according to the playback synchronization instruction, receiving a stereo sound and audio equalization instruction, and applying, according to the stereo sound and audio equalization instruction, stereo sound and audio equalization settings to the playback of the media item at the computing device.

In one implementation, the playback synchronization instruction includes identification of the media item, a timestamp in the media item, and a synchronized clock time. Furthermore, the stereo sound and audio equalization settings at the one or more other computing devices are different than the stereo sound and audio equalization settings at the computing device. In addition, the method may further include presenting a prompt in a user interface (UI) of the computing device, the prompt to query whether to join the speaker mesh network with the detected one or more other computing devices, and receiving, via the UI having the prompt, the confirmation to join the speaker mesh network.

In another implementation, the method further includes transmitting one or more sensor readings to a master computing device of the speaker mesh network. Furthermore, the one or more sensor readings may include an audio input at one or more microphones of the computing device. In addition, the one or more sensor readings may include a compass reading of the computing device. In one implementation, the one or more sensor readings comprise a global positing system (GPS) reading of the computing device. Additionally, the one or more sensor readings may comprise a barometric sensor reading of the computing device.

In some implementations, the one or more sensor readings are used by the master computing device to determine a topology of the speaker mesh network. Furthermore, the stereo sound and audio equalization instructions may be based on the topology of the speaker mesh network. In addition, the method may further include transmitting updated sensor readings to the master computing device on at periodic time intervals, the updated sensor readings used by the master computing device to update the topology of the speaker mesh network and to send updated stereo sound and audio equalization instructions. Additionally, the stereo setting may include proportions of audio tracks of the media item to output during the playback of the media item, and wherein the audio equalization settings may include a proportion of bass and a proportion of treble to apply to the playback of the media item.

Computing devices for performing the operations of the above described method and the various implementations described herein are disclosed. Computer-readable media that store instructions for performing operations associated with the above described method and the various implementations described herein are also disclosed.

BRIEF DESCRIPTION OF THE DRAWINGS

The present disclosure is illustrated by way of example, and not by way of limitation, in the figures of the accompanying drawings.

DETAILED DESCRIPTION

Aspects and implementations of the disclosure are directed to a mesh network of nearby mobile devices as a combined speaker system for audio. In one implementation, multiple computing devices, such as mobile devices including cell phones and tablet devices, can join together as a mesh network speaker system. A mesh network refers to a network topology in which each node relays data for the network. Each node in the mesh network cooperates in the distribution of data in the network. As such, in a speaker mesh network, each computing device (e.g., node) joined in the mesh network cooperates to create improved audio output (e.g., louder and/or higher quality audio output) of a media item.

In some implementations, speaker mesh network components in either, or both of, client computing devices and/or server computing devices work in conjunction to provide the mesh network speaker system. In one implementation, when a speaker mesh network component in a client computing device detects other nearby client computing devices, the speaker mesh network component prompts the client computing device to join the speaker mesh network. In addition, speaker mesh network components in the other nearby client computing devices similarly prompt the nearby computing devices to join the speaker mesh network. Once the speaker mesh network is established, a speaker mesh network component at a master computing device (i.e., one of the client computing devices or a server device) acts as a master in a topology of the speaker mesh network and coordinates playback synchronization, stereo sound, and audio equalization signaling among the client computing devices of the speaker mesh network.

The stereo sound and audio equalization signaling may be based on the topology of the speaker mesh network as determined by the master computing device. The master computing device may determine the topology based on sensor readings sent to the master computing devices from the client computing devices. In some implementations, the speaker mesh network component may also implement a feedback system to listen to the overall audio output among the client computing devices of the speaker mesh network and make adjustments to the stereo sound and audio equalization signaling to optimize audio output in the speaker mesh network.

Existing approaches to providing audio do not provide for improved audio quality by determining a topology of the network and providing instructions for stereo sound and audio equalization signaling among the computing devices in the network. For example, existing approaches do not provide a master computing device that understands relative positioning among nodes of the speaker mesh network and adjusts audio output of each computing device node based on such an understanding. Implementations of the disclosure provide improved audio quality using multiple computing devices by creating a mesh network of nearby mobile devices as a combined speaker system for audio. In some implementations, audio output is synchronized among the devices, and stereo sound and audio equalization are provided among the devices based on a topology of the speaker mesh network.

Implementations of the disclosure often reference videos for simplicity and brevity. However, the teaching of the present disclosure are applied to media items generally and can be applied to various types of content or media items, including for example, video, audio, text, images, program instructions, etc.

Figure 1:
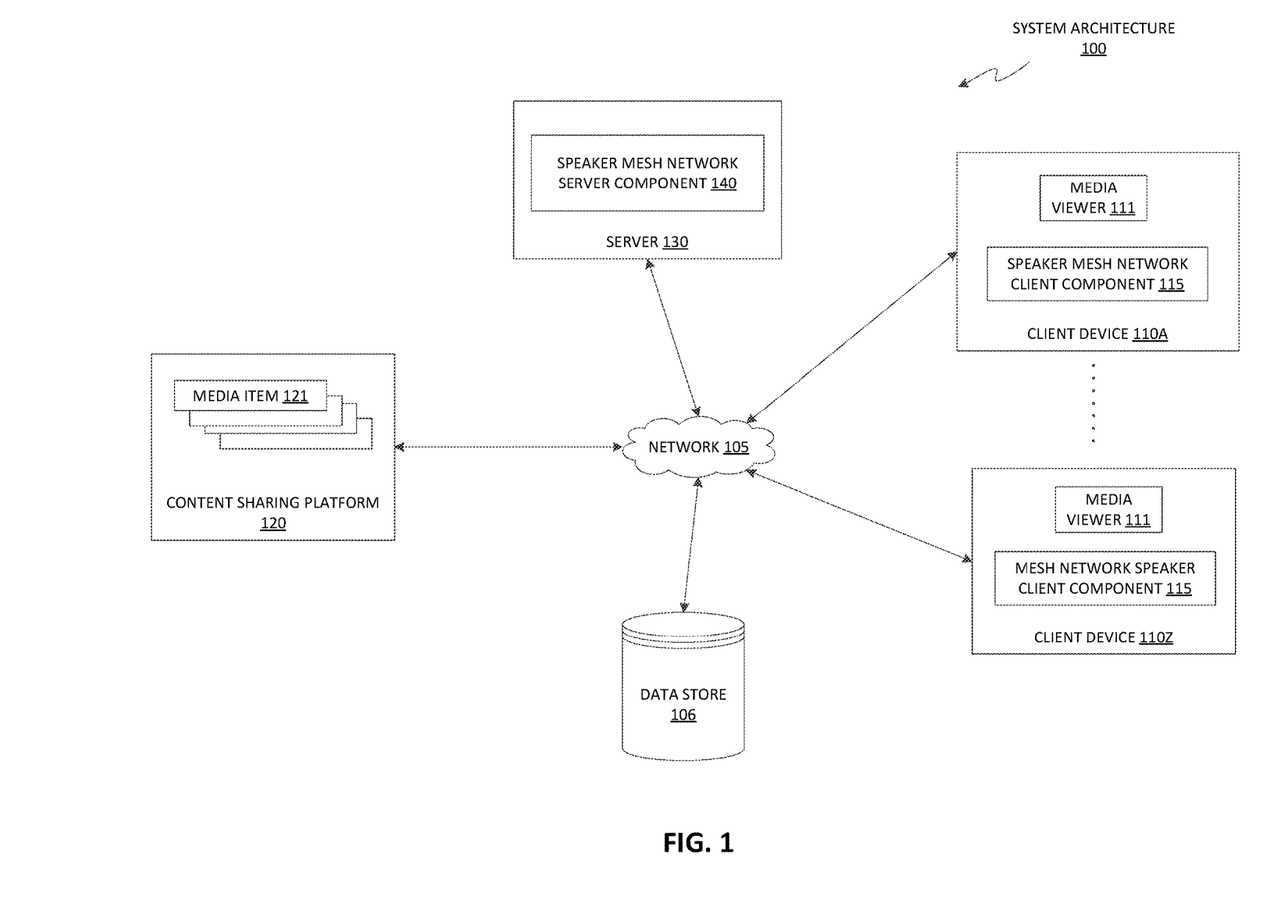
FIG. 1 is a block diagram illustrating an exemplary network architecture in which implementations of the disclosure may be implemented.

FIG. 1 illustrates an example system architecture 100, in accordance with one implementation of the disclosure. The system architecture 100 includes client devices 110A through 110Z, a network 105, a data store 106, a content sharing platform 120, and a server 130. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers, network-connected televisions, etc. In some implementations, client device 110A through 110Z may also be referred to as "user devices." Each client device includes a media viewer 111. In one implementation, the media viewers 111 may be applications that allow users to view content, such as images, videos, web pages, documents, etc. For example, the media viewer 111 may be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application (e.g., a mobile application or app) that allows users to view digital media items (e.g., digital videos, digital images, electronic books, etc.). According to aspects of the disclosure, the media viewer 111 may be a content sharing platform application for users to record, edit, and/or upload content for sharing on the content sharing platform, and implements a mesh network of computing devices as a combined speaker system for audio.

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that are downloaded from the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) or application back-end software that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may host data content, such as media items 121. The data content can be digital content chosen by a user, digital content made available by a user, digital content uploaded by a user, digital content chosen by a content provider, digital content chosen by a broadcaster, etc. Examples of a media item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media item 121 is also referred to as a content item.

A media item 121 may be consumed via the Internet and/or via a mobile device application. For brevity and simplicity, an online video (also hereinafter referred to as a video) is used as an example of a media item 121 throughout this document. As used herein. "media," media item," "online media item." "digital media," "digital media item." "content." and "content item" can include an electronic file that can be executed or loaded using software, firmware or hardware configured to present the digital media item to an entity. In one implementation, the content sharing platform 120 may store the media items 121 using the data store 106.

In one implementation, the server 130 may be one or more computing devices (e.g., a rackmount server, a server computer, etc.). In one implementation, the server 130 may be included in the content sharing platform 120. The server 130 may include a speaker mesh network server component 140. The speaker mesh network server component 140 enables multiple computing devices, such as mobile devices including phones and tablets, to join together in a mesh network speaker system in implementations of the disclosure. A mesh network refers to a network topology in which each node relays data for the network. Each node in the mesh network cooperates in the distribution of data in the network. As such, in a speaker mesh network, each computing device (e.g., node) joined in the mesh network cooperates to create improved audio output (e.g., louder and/or higher quality audio output) of a media item.

In some implementations, client device 110A-110Z may include a speaker mesh network client component 115 that works in conjunction with (or in some implementations, works independently of) speaker mesh network server component 140 to provide the mesh network speaker system. Speaker mesh network client component 115 may perform implementations of the disclosure independently of speaker mesh network server component 140 of server 130, or may work in conjunction with speaker mesh network server component 140. Although the following description may refer to speaker mesh network server component 140 performing implementations of the disclosure, it should be understood that the functionality of speaker mesh network server component 140 may be similarly performed solely by, and/or in conjunction with, speaker mesh network client component 115 at client device 110A-110Z.

In one implementation, speaker mesh network client component 115 of a client device 110A-110Z, may detect other nearby client devices 110A-110Z and prompt the other devices 110A-110Z to join the speaker mesh network. Once the speaker mesh network is established, speaker mesh network server component 140 may act as a master computing device in the speaker mesh network topology and coordinate playback synchronization, stereo sound, and audio equalization signaling among the nodes (e.g., client devices 110A-110Z) of the speaker mesh network. In some implementations, speaker mesh network server component 140 may implement a feedback system to listen to the overall audio output among the speaker mesh network nodes and make adjustments to stereo sound and audio equalization signaling to optimize audio output in the speaker mesh network. As discussed above, in some implementations, speaker mesh network client component 115 may act as the master computing device for the speaker mesh network (e.g., when an Internet connection is not available).

In some implementations, speaker mesh network server component 140 of server 130 may interact with content sharing platform 120 to provide implementations of the disclosure. Further description of the speaker mesh network server component 140 and the speaker mesh network client component 115, as well as their specific functions, are described in more detail below with respect to FIG. 2.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city. ZIP code, or state level), so that a particular location of a user cannot be determined. Thus, the user may have control over how information is collected about the user and used by the content sharing platform 120.

Figure 2:
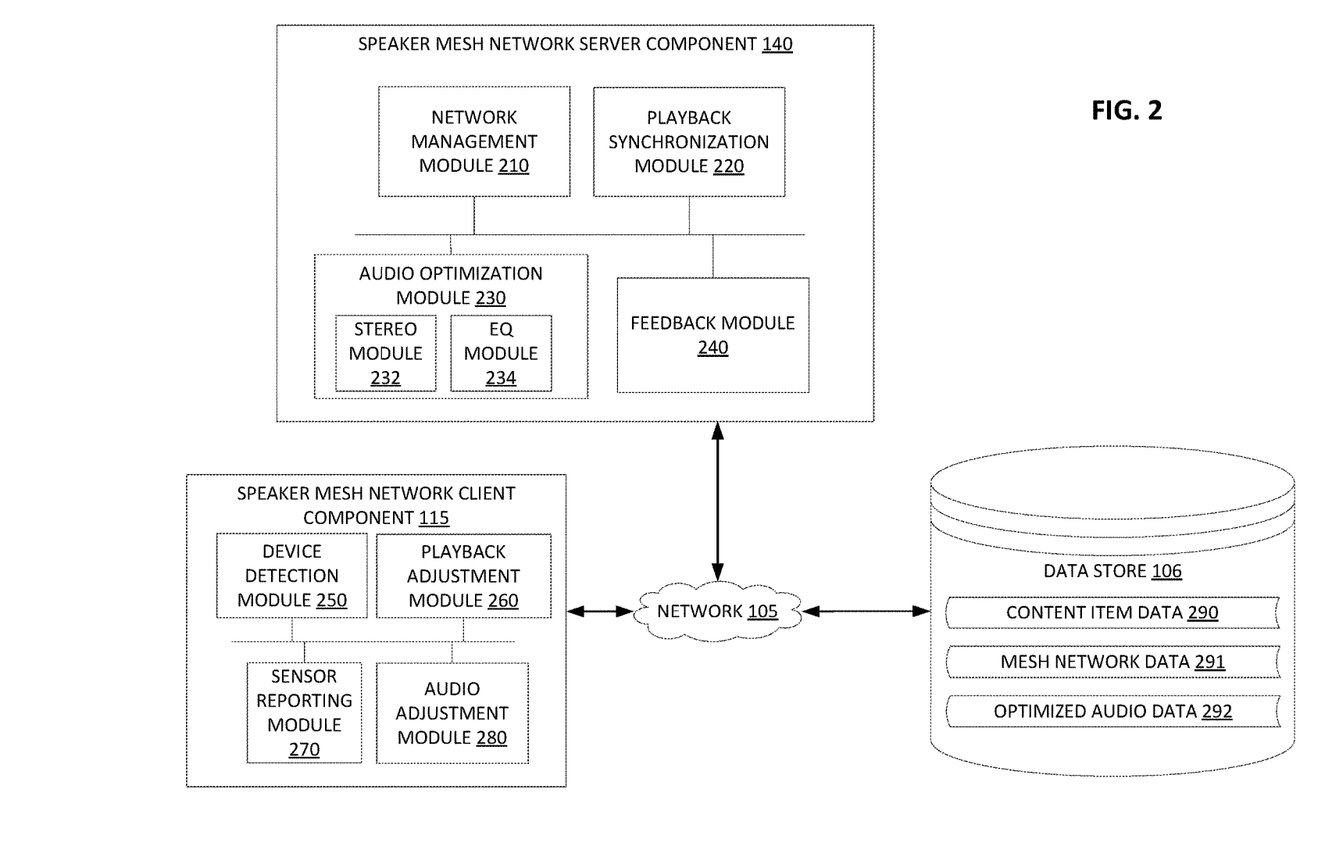
FIG. 2 is a block diagram of speaker mesh network server component and speaker mesh network client component, in accordance with an implementation of the disclosure.

FIG. 2 is a block diagram illustrating speaker mesh network server component 140 and speaker mesh network client component 115 in accordance with one implementation of the disclosure. As discussed above, the speaker mesh network server component 140 may interact with a single social network, or may be utilized among multiple social networks (e.g., provided as a service of a content sharing platform that is utilized by other third party social networks). In one implementation, the speaker mesh network server component 140 includes a network management module 210, a playback synchronization module 220, an audio optimization module 230, and a feedback module 240. More or less components may be included in the speaker mesh network server component 140 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/ or external servers.

The speaker mesh network server component 140 is communicatively coupled to the speaker mesh network client component 115 and the data store 106. For example, the speaker mesh network server component 140 may be coupled to speaker mesh network client component 115 and the data store 106 via a network (e.g., via network 105 as illustrated in FIG. 1).

In one implementation, the speaker mesh network client component 115 includes a device detection module 250, a playback adjustment module 260, a sensor reporting module 270, and an audio adjustment module 280. More or less components may be included in the speaker mesh network client component 115 without loss of generality. For example, two of the modules may be combined into a single module, or one of the modules may be divided into two or more modules. In one implementation, one or more of the modules may reside on different computing devices (e.g., different server computers, on a single client device, or distributed among multiple client devices, etc.). Furthermore, one or more of the modules may reside on different content sharing platforms, third party social networks, and/ or external servers.

The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, mesh network data 291, and optimized audio data 292.

As discussed above, the speaker mesh network server component 140 and the speaker mesh network client component 115, individually and/or in combination, enable multiple computing devices, such as mobile devices including phones and tablets, to cooperate as a speaker mesh network system in implementations of the disclosure. The audio outputs from audio output devices (e.g., speakers) of the computing devices of the speaker mesh network are synchronized and optimized in order to amplify audio output and/or improve the overall audio quality of the audio output from the computing devices. As a result, the computing devices joined together in the speaker mesh network provide improved audio output (e.g., louder and higher quality audio output) of a media item than would be provided by a single computing device alone. In one implementation, media item may include a video or an audio file, which may be stored as content item data 290 in data store 106.

In one implementation, to create a mesh network of computing devices as a combined speaker system for audio, the device detection module 250 of mesh network speaker client component 115 may include logic to detect other nearby computing devices (e.g., mobile devices) and prompt the other devices to join a speaker mesh network. The device detection module 250 may utilize a variety of processes for speaker mesh network device detection. In one implementation, device detection module 250 may use Bluetooth pairing, peer-to-peer WiFi, and/or audio detection of audio signatures, for example, to detect other nearby computing devices.

With respect to Bluetooth pairing, the device detection component 250 may utilize Bluetooth functionality (provided at the computing device hosting the device detection component 250) to recognize one or more other computing devices (in a nearby vicinity defined by the Bluetooth protocol range) via a Bluetooth pairing protocol. In some implementations, this may be an automatic process that does not involve user interaction or it may be an active process requiring affirmative actions by a user (i.e., opting in, entering a code provided on one of the computing devices, etc.).

With respect to peer-to-peer WiFi, the device detection component 250 may utilize a WiFi protocol to recognize one or more other computing devices (in a nearby vicinity defined by the WiFi protocol range) via a peer to peer WiFi protocol. The peer-to-peer WiFi protocol is used to establish an ad hoc wireless network between computing devices within the WiFi protocol range. One of the computing devices may act as a wireless router that can take connections from other computing devices in the area that all connect to this wireless router. Once the computing device acting as a wireless network is broadcasting a network, each computing device in the network can utilize the WiFi protocol to transmit data (including audio) between devices.

With respect to audio signatures, the device detection component 250 may utilize an audio signature to identify nearby computing devices for purposes of prompting the computing devices to join a speaker mesh network. For example, the device detection component 250 may use a microphone to identify an audio portion of a media item that is playing on another computing device or to listen for an inaudible (to the human ear) signature tone emitted from another computing device. In one implementation, the device detection component 250 may listen for an audio portion that is the same as currently-playing audio of a media item on the computing device. In another implementation, the inaudible audio signature tone may identify the application on the other computing device that is being used to play a media item.

In some implementations, more than one of the above-described device detection processes may be used to detect nearby computing devices and prompt to join a speaker mesh network. For example, the audio signature process may be used to determine that potential computing devices for a speaker mesh network are nearby, and then the Bluetooth or peer-to-peer WiFi protocol may be used to gather identifying information of those nearby computing devices for purposes of providing the prompt.

In one implementation, when the device detection module 250 detects other computing devices using one or more of the above-described processes (e.g., Bluetooth, peer-to-peer WiFi, audio signature), it may cause a prompt to be displayed on its associated computing device to enable the speaker mesh network connection on the computing device. In one implementation, enabling a speaker mesh network connection on a computing device may also be referred to as enabling a "multi-device stereo mode" on the computing device.

Figure 3A:
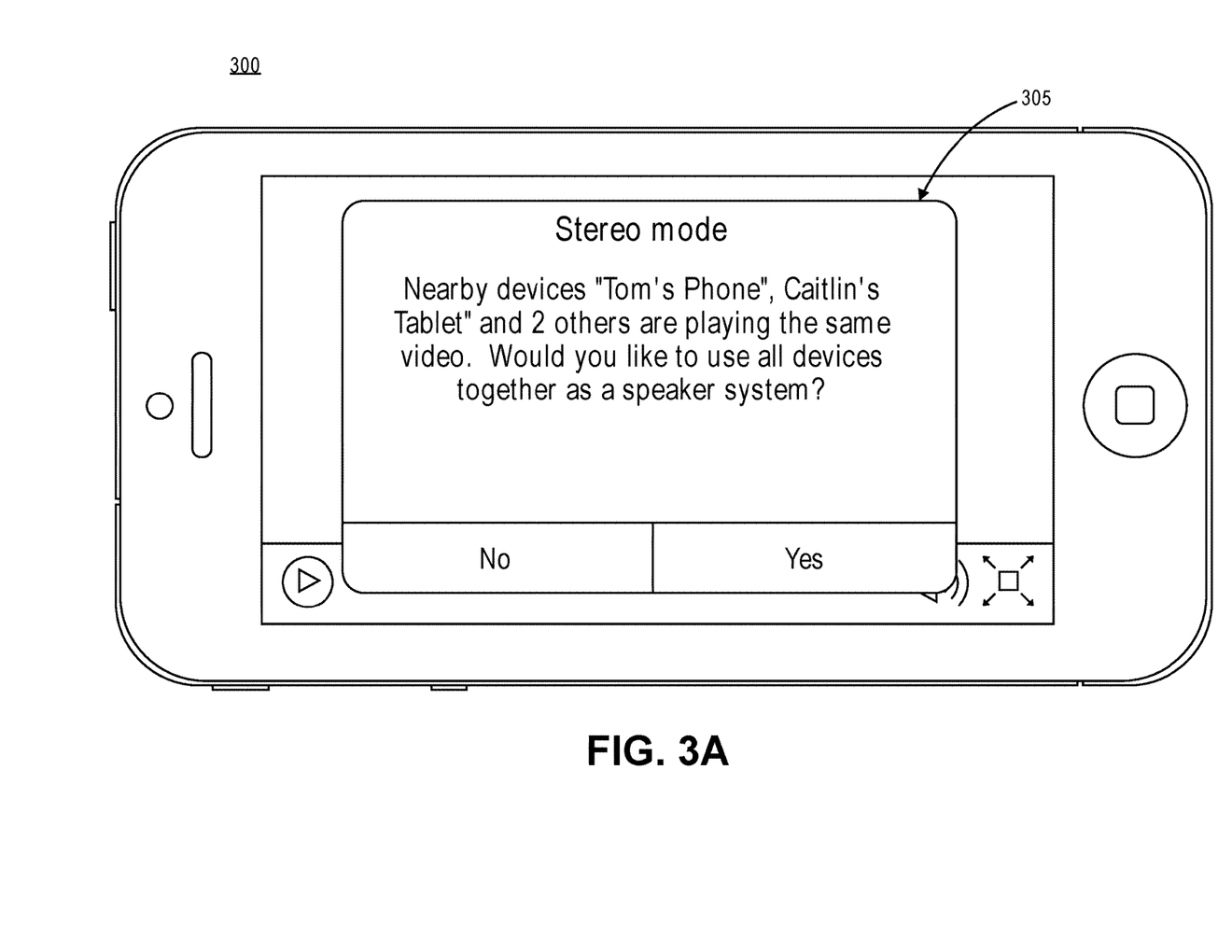
FIGS. 3A through 3C are exemplary screenshots of a UI for a mesh network of computing devices as a combined speaker system for audio, according to implementations of the disclosure.

FIG. 3A depicts an exemplary screenshot of a UI 300 including a prompt 305 according to implementations of the disclosure. Prompt 305 may be displayed to notify a user that nearby computing devices have been detected and to request confirmation from the user for the computing device to establish and/or join a speaker mesh network with the detected computing devices. In some implementations, the prompt 305 may provide identification of the other nearby computing devices (e.g., "Tom's Phone", "Caitlin's Phone", etc.).

Figure 3B:
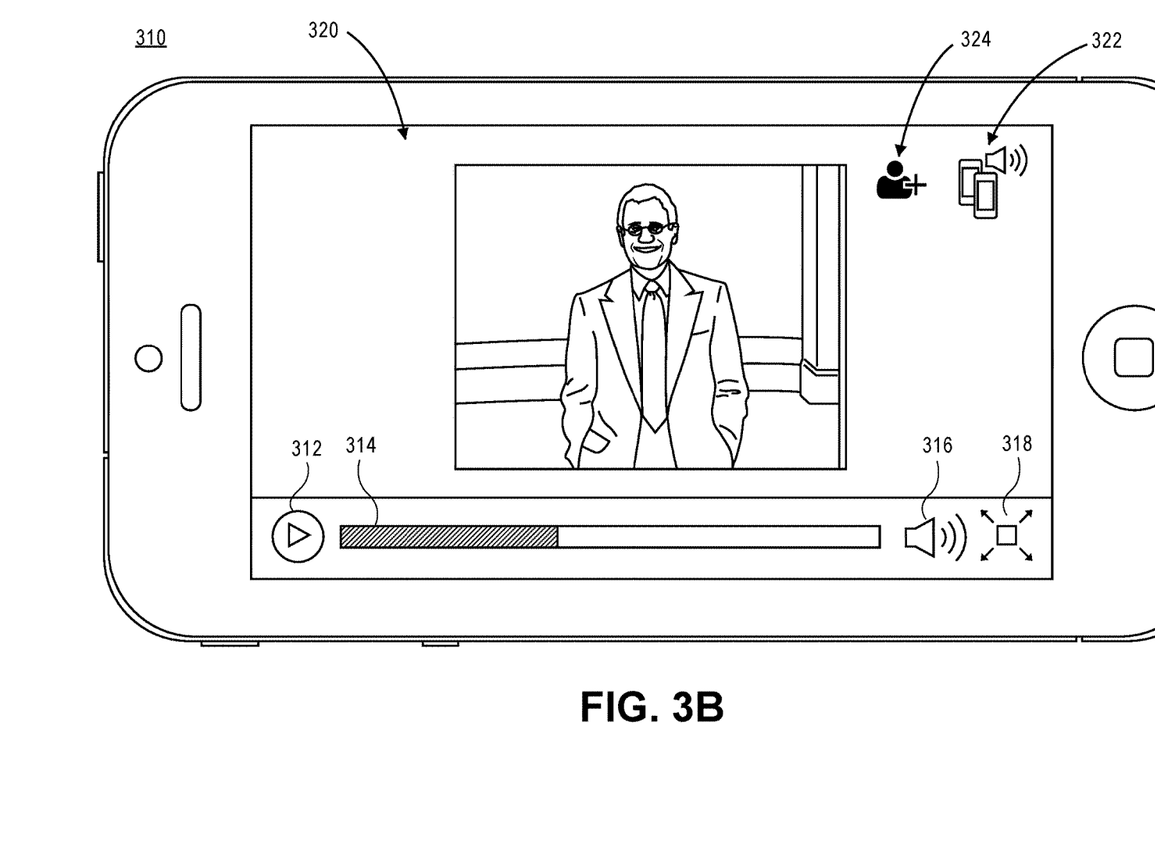

FIG. 3B depicts another exemplary screenshot of a UI 310 providing a speaker mesh network indicator. UI 310 may include a media player having a playback area 320 displaying playback of a media item, a play button 312, a scrub bar 314, a volume indicator 316, and a full screen toggle 318. A multi-device stereo mode indicator 322 (e.g., speaker mesh network indicator) may be displayed in the playback area 320 when multi-device stereo mode is enabled and/or available (i.e., because the computing device detects nearby computing devices via the above-described device detection processes). An add speaker indicator 324 may also be displayed to allow a user to manually invite other computing devices to join the speaker mesh network.

Figure 3C:
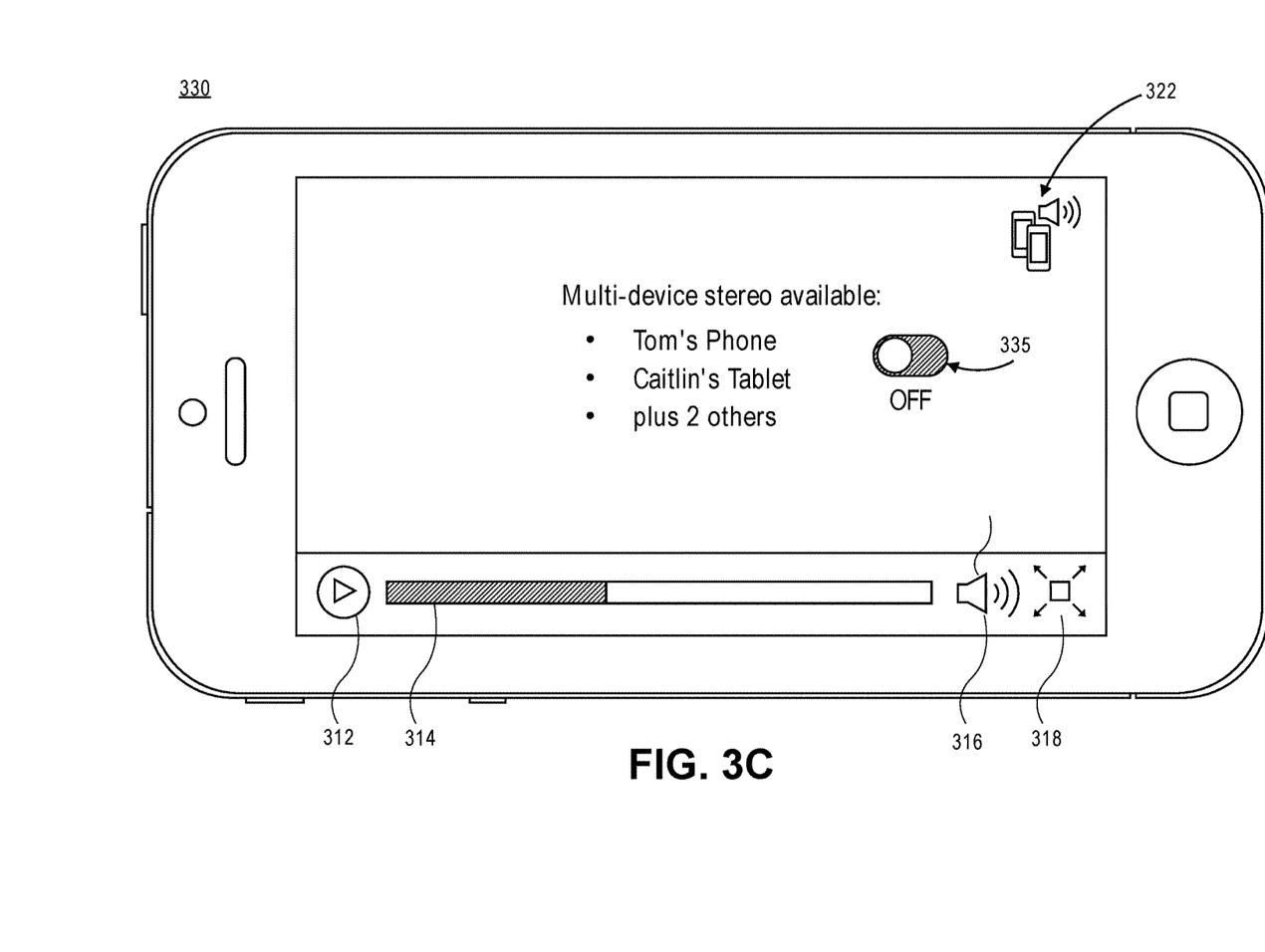

When a user selects stereo mode indicator 322, UI 330 as shown in FIG. 3C, may be provided. FIG. 3C is a block diagram depicting an exemplary screenshot of UI 330. UI 330 displays a control 335 to toggle multi-device stereo mode on and off. UI 330 may also include media player controls, such as play button 312, scrub bar 314, volume indicator 316, and full screen toggle 318, for example.

Referring back to FIG. 2, once confirmation to join the speaker mesh network is received, the device detection component 250 may notify the network management module 210 of speaker mesh network server component 140 that the computing device has joined a speaker mesh network. In some implementations, identifiers of the other computing devices, such as the identifiers provided in the above-described prompt, are also provided to the network management module 210. The network management module 210 then maintains identifying information corresponding to the speaker mesh network, such as a network identifier for the speaker mesh network and individual identifiers for each computing devices that is a member of the network. In one implementation, the identifying information is stored as mesh network data 291 in data store 106.

Once the speaker mesh network is established, speaker mesh network server component 140 may act as a master in the speaker mesh network and coordinate playback, stereo sound, and audio equalization signaling among the computing devices (e.g., nodes) of the speaker mesh network. The playback synchronization module 220, the audio optimization module 230, and the feedback module 240 are utilized to coordinate the playback, stereo sound, and audio equalization signaling within the speaker mesh network.

In one implementation, the playback synchronization module 220 may send directives to each computing device in the speaker mesh network regarding which media item (e.g., audio, video, etc.) the computing device should play and what playback point of the media item the computing device should be synchronized ("synced") to. In some implementations, the playback synchronization module 200 assumes that each computing device maintains an internal clock that is kept in sync with other computing devices in the speaker mesh network. For the purposes of establishing an initial playback time, the first computing device to join the speaker mesh network may determine the time in the media item that all other computing devices in the speaker mesh network are to be initialized to. As a result, the first computing device does not experience any interruption in its audio; it simply continues to play. This first computing device to join may periodically transmit, via its playback synchronization module 260, its playback status to the playback synchronization module 220. The playback status may include, but is not limited to, two pieces of information: (i) the timestamp of a current playback point in the media item, and (ii) the current reading of the computing device's synchronized clock.

When a second, third, or $N^{th}$ computing device opts to join the speaker mesh network, the playback synchronization module 220 may send a directive (e.g., instruction) to the joining computing device, instructing the computing device to synchronize its playback to a time [t] in the media item, relative to a synchronized clock time [c]. The playback adjustment module 260 on each recipient computing device performs a calculation (e.g., addition) to determine what point in the media item that the recipient computing device should sync to, relative to the amount of time that has elapsed since the directive originated on the first computing device in the speaker mesh network.

For example, the first computing device indicates that playback point is at the 23 s mark when the clock of the first computing device was at 6:03 pm and 253 milliseconds. Subsequently, the playback adjustment module 260 of the recipient computing device determines to synchronize playback at the 23.5 s mark of the media item due to its clock currently indicating the computing device is 500 ms (half a second) later than the first computing device's indicated time.

In some implementations, each computing device that is a member of the speaker mesh network can rewind or fast forward (e.g., scrubbing) in a media item, and other computing devices in the network can synchronize to such rewinding and fast forwarding. To achieve this, any computing device in the speaker mesh network that advances or rewinds to a different playback time in a media item communicates this to the server (e.g., to speaker mesh network server component 140). The playback adjustment module 260 transmits a time [t] in the media item that the computing device scrubbed to, along with a clock reading [c] of when the scrubbing occurred. This information is transmitted to the playback synchronization module 220, which then instructs all other computing devices in the speaker mesh network to synchronize to [t, c]. Upon receiving this instruction, the playback adjustment module 260 of each computing device calculates its internal time minus the indicated time [c], and moves to the specified timestamp point [t] plus the amount of time that has elapsed since the directive originated.

In further implementations, the speaker mesh network may be implemented to allow the computing device members to synchronize playback of offline media items when the computing devices have no internet connection. For example, the computing devices may synchronize playback of pre-downloaded audio or video when the computing devices are located in a setting where no internet is available, but peer-to-peer connections are possible. In such an implementation, one of the computing devices (e.g., the first one to join and/or establish the speaker mesh network) may act as the master in the speaker mesh network, coordinating playback and sending directives to the other computing device members of the speaker mesh network in accordance with the above description. In some implementations, each client computing device may include a speaker mesh network server component 140 that is enabled if no internet connection is detected. As discussed above, the client computing device that is the first to join the speaker mesh network establishes the speaker mesh network and acts as the master computing device in the speaker mesh network.

In some implementations, a user of the client computing device authorizes the client computing device to act as a master computing device in the speaker mesh network (e.g., via a prompt provided in a UI by the speaker mesh network client component 115).

In one implementation, speaker mesh network server component 140 may also coordinate stereo sound (e.g., two or more tracks of the audio played back through different speakers positioned around a listening user) and audio equalization signaling among the nodes (computing device members) of the speaker mesh network. The speaker mesh network server component 140 may act as the master for determining where the computing device members of the speaker mesh network are positionally located relative to one another, and for determining which stereo sound and audio equalization settings each computing device should apply.

The sensor reporting module 270 of each computing device in the speaker mesh network may periodically transmit one or more sensor readings from the computing device to the audio optimization module 230. The sensor readings may include, but are not limited to, microphone inputs, compass readings, global positioning system (GPS) readings, and barometric readings. Utilizing these readings, the audio optimization module 230 may determine the overall topology of the different computing devices of the speaker mesh network, using the sum of the sensor readings.

For example, based on the strength of sound that is received at the microphones of a first computing device, the audio optimization module 230 can determine where the first computing devices is located positionally relative to another computing device. For example, if the strength of an audio input is stronger in a left microphone of the first computing device versus a right microphone, the audio optimization module 230 may determine that the first computing device is located to the right of another computing device. In addition, barometric readings (i.e., altitude) from computing devices may be combined with directional sensing of audio to determine whether a computing device is located above or below another computing device. Furthermore, compass readings can provide orientation data for the computing devices, such as indicating whether a computing device is facing forward or backward relative to another computing device.

Based on the determined topology of the speaker mesh network, the stereo module 232 of the audio optimization module 230 may instruct each computing device regarding playback of a particular audio track (e.g., left track, right track, center audio, etc.) of the media item. A media item may be recorded with two or more tracks (e.g., recorded at different distances through different microphones), and these two or more tracks may each be played back through different speakers positioned around a listening user. This may also be referred to as stereo sound. One implementation of stereo sound is right and left channel stereo. With right and left channel stereo, a media item is recorded with two tracks, and the two tracks may be played through two different speakers positioned at the listening user's right and left. The two tracks may be referred to as right channel and left channel or as right track and left track. There also exist systems where a media item may contain multiple audio tracks (more than 2) to allow for "surround sound." In surround sound, there may be N different audio tracks (e.g., a center track, left track, right track, rear left track, rear right track, and so on).

The stereo module 232 may instruct each computing device, based on the position of the computing device in the determined topology of the speaker mesh network, which audio track the computing device should play. Initially, the stereo module 232 may default to having each computing device play the same center track. Then, as sufficient data from the computing devices is received to allow the audio optimization module 230 to determine the speaker mesh network topology, the stereo module 232 may begin to transmit instructions to each computing device regarding which audio track/channel of the media item it should play. In one implementation, the stereo sound track information used to transmit instructions to the computing devices may be stored as optimized audio data 292 in data store 106.

In one example, when the media track that is streamed to the computing devices of the speaker mesh network contains both a left track and a right track, the stereo module 232 may provide one additional piece of information to the client: a number indicating in what proportion the computing device should play the left track versus the right track (e.g., 75% right track, 25% left track). If the sensor readings indicate the multiple computing devices in the speaker mesh network report non-contradictory numbers (e.g., three devices are determined to have left/right linear positions of −1, +0.1, and +1, respectively), then the stereo mode 232 may instruct the −1 device to play entirely the left track audio, the +0.1 device to play 45% left track audio and 55% right track audio, and the +1 device to play entirely the right track audio.

In a more complex surround sound media item, the stereo module 232 may cause different audio tracks of the media item to be streamed to respective computing devices. This avoids using excessive bandwidth, which may occur if the N different audio tracks were all streamed to each of the different computing devices in the speaker mesh network.

The determined topology of the speaker mesh network may also be utilized by equalization (EQ) module 234 to coordinate audio equalization of the audio signal output from each of the computing devices in the speaker mesh network. Audio equalization (referred to herein as "EQ") is the process used to alter frequencies in an audio signal. In one implementation. EQ may be implemented by applying treble and bass adjustments to an audio signal. The EQ module 234 may utilize the sensor readings to generate instructions to adjust bass and treble settings of the audio signal outputted by the computing devices of the speaker mesh network. In one implementation, the audio equalization information used to transmit instructions to the computing devices may also be stored as optimized audio data 292 in data store 106.

In some implementations, feedback module 240 utilizes information gleaned from the overall audio output of the speaker mesh network (e.g., via periodic sensor readings) and makes adjustments to stereo and EQ signaling to optimize the audio output and audio quality in the speaker mesh network. For example, as the computing devices are playing synchronized audio, the sensor reporting module 270 may continually and/or periodically use microphones of the computing devices to listen to audio around the computing devices and report the corresponding audio readings. This information may be utilized by feedback module 240 to continually and/or periodically refine and calibrate the audio signal via instructions from stereo module 232 and EQ module 234.

Figure 4:
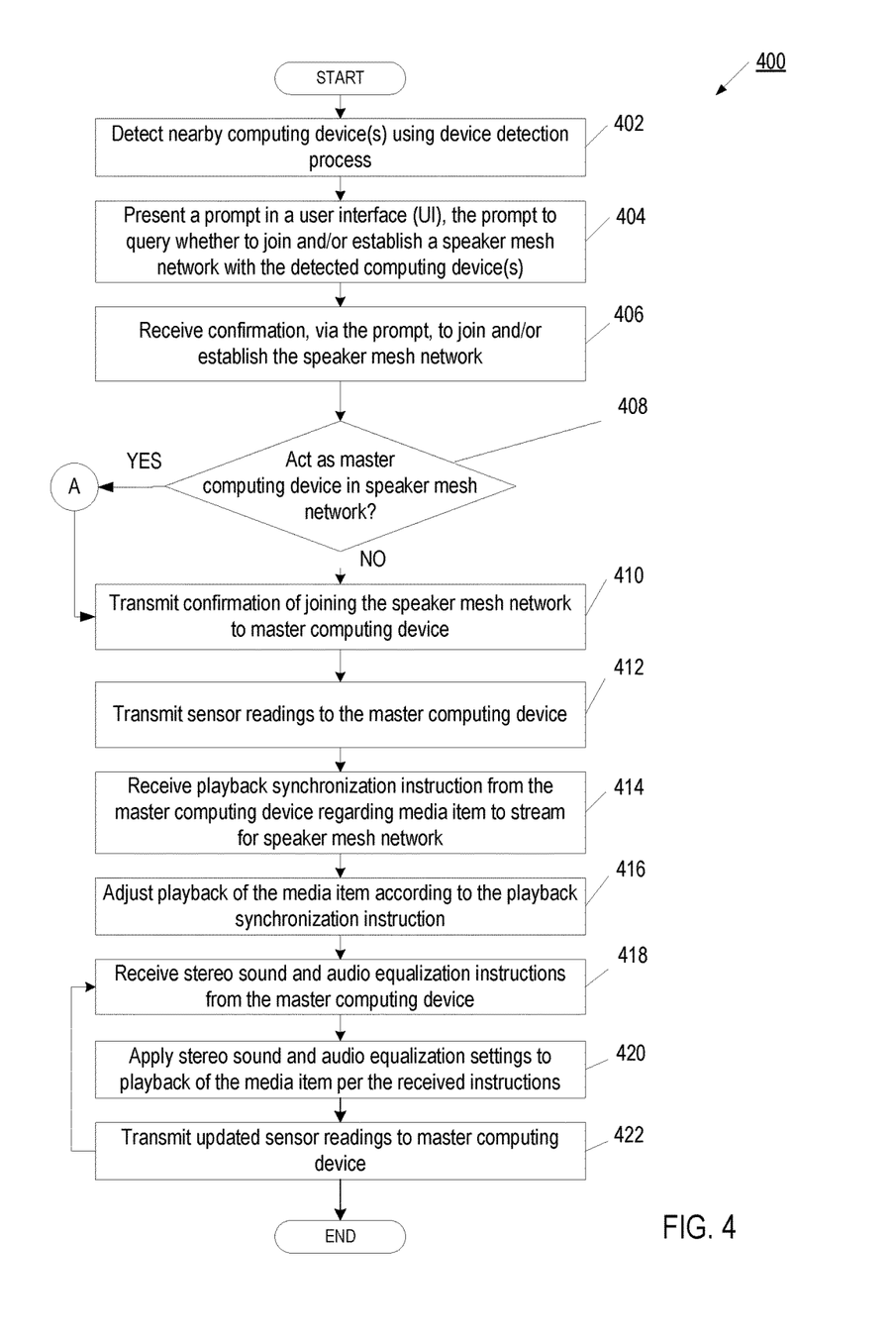
FIG. 4 is a flow diagram illustrating a method for a mesh network of computing devices as a combined speaker system for audio according to an implementation.

FIG. 4 is a flow diagram illustrating a method 400 for a mesh network of computing devices as a combined speaker system for audio, according to an implementation of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 400 may be performed by speaker mesh network client component 115 as shown in FIG. 2.

Method 400 begins at block 402 where one or more nearby computing devices are detected using a device detection process. As described above, the device detection process may include Bluetooth, peer-to-peer WiFi, and/or audio signature analysis, to name a few examples. At block 404, a prompt is presented in a UI, where the prompt queries whether to join and/or establish a speaker mesh network (e.g., multi-device stereo mode) with the one or more detected computing devices. At block 406, confirmation is received (i.e., from a user), via the prompt, to join and/or establish the speaker mesh network.

At decision block 408, it is determined whether the computing device is to act as a master computing device in the speaker mesh network. In one implementation, the master computing device may be a server device hosting one or more media items that are selectable for playback (e.g., a content sharing platform). In other implementations, the master computing device may be one of the client computing devices in the speaker mesh network (e.g., when no internet connection is available). The first computing device to join the speaker mesh network may act as the master computing device in some implementations. If the client computing device is to act as the master computing device of the speaker mesh network at decision block 408, then method 400 proceeds to on-page reference "A", which directs to method 500. A client computing device acting as a master computing device performs method 500 (described with respect to FIG. 5 further below) in order to establish the speaker mesh network. In some implementations, a user of the client computing device authorizes the client computing device to act as a master computing device in the speaker mesh network (e.g., via a prompt provided in a UI by the speaker mesh network client component 115). Subsequent to, and/or concurrent with, performance of method 500 (e.g., when the client computing device is acting as master computing device), method 400 may then proceed to block 410. If the computing device is not acting as a master computing device at decision block 408, then method 400 proceeds to block 410.

At block 410, the received confirmation to join the speaker mesh network is transmitted to a master computing device. Subsequently, at block 412, sensor readings are obtained and transmitted to the master computing device. In one implementation, the sensor readings include microphone input, GPS readings, compass readings, barometric sensor readings, and so on. Subsequently, at block 414, playback synchronization instructions are received from the master computing device regarding a media item to stream as part of the speaker mesh network. The playback synchronization instructions may include a time [t] representing a timestamp in the media item and a synchronized clock time [c]. At block 416, playback of the media item is adjusted according to the playback synchronization instruction. As discussed above, adjusting playback according to the instruction may include synchronizing playback of the media item to time [t] relative to the received synchronized clock time [c].

At block 418, stereo sound and audio equalization instructions are received from the master computing device. In one implementation, the stereo sound and audio equalization instructions are based on a topology of the speaker mesh network as determined by the master computing device based on the sensor readings received from the computing devices in the speaker mesh network. At block 420, stereo sound and audio equalization settings are applied to the playback of the media item per the received instructions. In one implementation, applying the stereo sound settings includes playing indicated proportions of left and right channel tracks of the media item. In another implementation, applying the audio equalization settings includes adjusting bass and treble settings for the media item audio output.

Figure 5:
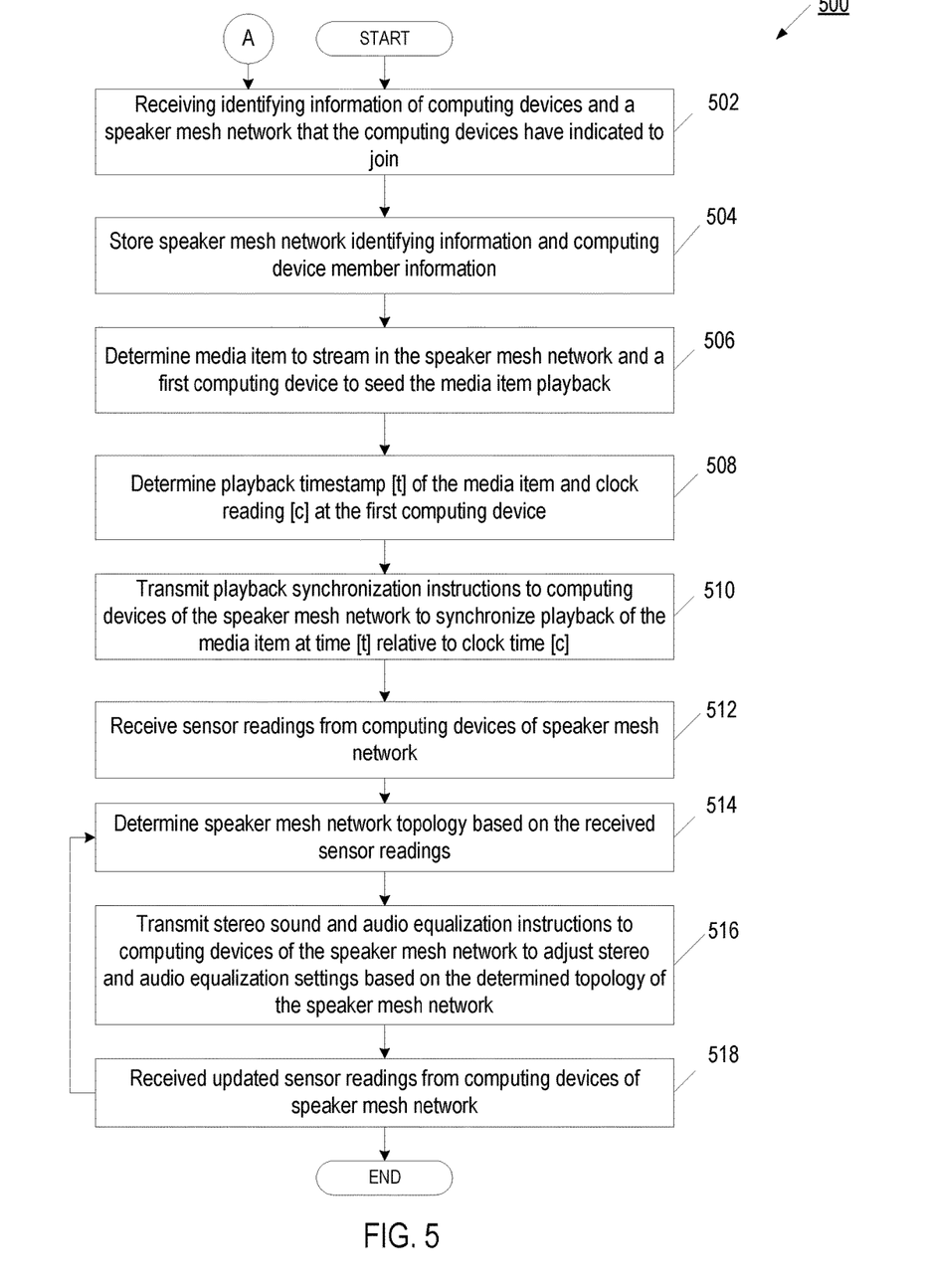
FIG. 5 is a flow diagram illustrating another method for a mesh network of computing devices as a combined speaker system for audio, according to an implementation.

At block 422, updated sensor readings are transmitted to the master computing device. In one implementation, the updated sensor readings are sent on a periodic basis and result in updated stereo sound and audio equalization instructions being received from the master computing device at blocks 418 and 420. If the client computing device performing method 400 is acting as the master computing device (per decision block 408), then blocks 512 through 518 of method 500 may be repeated to process the updated sensor readings and generating updated stereo sound and audio equalization instructions.

FIG. 5 is a flow diagram illustrating another method 500 for a mesh network of computing devices as a combined speaker system for audio, according to some implementations of the disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. In one implementation, method 500 may be performed by speaker mesh network server component 140 as shown in FIG. 2. In some implementations, method 500 may be performed by a client device 110A-110Z as shown in FIG. 1 when such client device 110A-110Z is acting as a master client in a speaker mesh network and implementing the processes of a speaker mesh network server component 140 (e.g., when no internet connection is available).

Method 500 begins at block 502 where identifying information is received, where the identifying information pertains to one or more computing devices and to a speaker mesh network that the one or more computing devices have indicated to join. At block 504, the identifying information of the computing devices and corresponding speaker mesh network is stored. At block 506, a media item to stream to the speaker mesh network is determined. In addition, a first computing device used to seed the media item playback is also determined. In one implementation, the first computing device to join the speaker mesh network may be the first computing device used for seeding purposes.

Subsequently, at block 508, a playback timestamp [t] of the media time and a clock time [c] at the first computing device is determined. In one implementation, the first computing device may already be playing back the media item, and the current timestamp [t] and clock time [c] is sampled and/or received from the first computing device. At block 510, playback synchronization instructions are transmitted to the one or more computing devices in the speaker mesh network to synchronize playback of the media item at time [t] relative to clock time [c].

At block 512, sensor readings from the computing devices of speaker mesh network at received. The sensor readings may include microphone inputs, compass readings. GPS readings, and/or barometric readings, to name a few examples. At block 514, a topology of the speaker mesh network is determined based on the received sensor readings. At block 516, stereo sound and audio equalization instructions are transmitted to the computing devices of the speaker mesh network. The stereo sound and audio equalization instructions are generated based on the determined topology of the speaker mesh network, and may differ for each computing device in the speaker mesh network.

Lastly, at block 518, updated sensor readings from the computing devices of the speaker mesh network are received on a periodic basis. The updated sensor readings may be used to update the topology of the speaker mesh network and send updated stereo sound and audio equalization instructions to the computing devices of the speaker mesh network at blocks 514 and 516.

Figure 6:
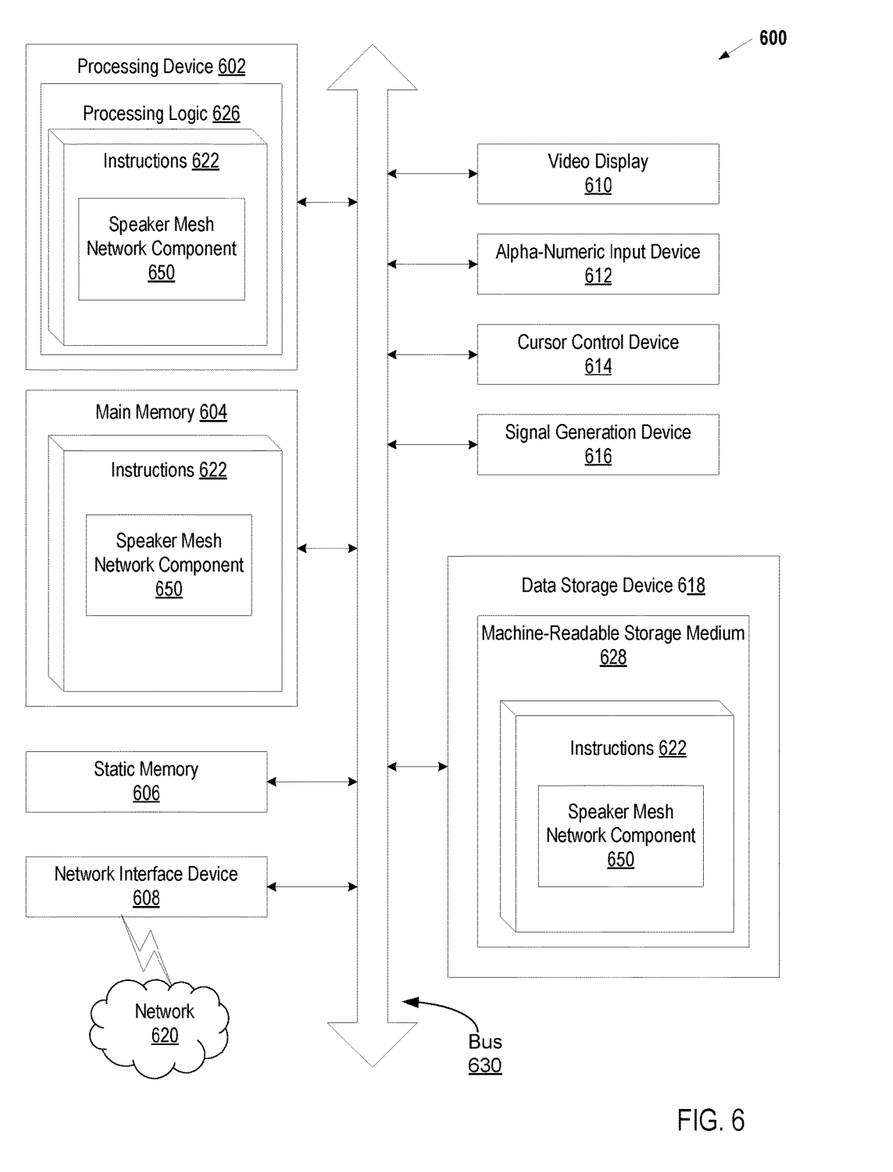
FIG. 6 is a block diagram illustrating one implementation of a computer system, according to an implementation.

FIG. 6 illustrates a diagrammatic representation of a machine in the exemplary form of a computer system 600 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 600 may be representative of a server (such as server 102) or client (such as client 110A-110Z) executing a speaker mesh network component 650, such as speaker mesh network server component 140 or speaker mesh network client component 115, as described with respect to FIGS. 1 and 2.

The exemplary computer system 600 includes a processing device 602, a main memory 604 (e.g., read-only memory (ROM), flash memory, dynamic random access memory (DRAM) (such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 602 is configured to execute processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable storage medium 628 (also referred to as a machine-readable storage medium), on which is stored one or more set of instructions 622 (e.g., software) embodying any one or more of the methodologies of functions described herein. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The computer-readable storage medium 628 may also be used to store instructions to perform a method for providing a mesh network of computing devices as a combined speaker system for audio, as described herein. While the computer-readable storage medium 628 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   detecting, by a processing device of a computing device, one or more other computing devices within a geographic vicinity of the computing device;
   transmitting a confirmation to join a speaker mesh network with the detected one or more other computing devices;
   receiving a playback synchronization instruction for a media item;
   adjusting playback of the media item according to the playback synchronization instruction, wherein the one or more other computing devices in the speaker mesh network provide synchronized playback of the media item according to the playback synchronization instruction;
   receiving, by the processing device, a stereo sound and audio equalization instruction, wherein the stereo sound and audio equalization instruction is based on a topology of the speaker mesh network; and
   applying, by the processing device according to the stereo sound and audio equalization instruction, stereo sound and audio equalization settings to the playback of the media item at the computing device.

2. The method of claim 1, wherein the playback synchronization instruction comprises identification of the media item, a timestamp in the media item, and a synchronized clock time.

3. The method of claim 1, wherein the stereo sound and audio equalization settings at the one or more other computing devices are different than the stereo sound and audio equalization settings at the computing device.

4. The method of claim 1, further comprising:
   presenting a prompt in a user interface (UI) of the computing device, the prompt to query whether to join the speaker mesh network with the detected one or more other computing devices; and
   receiving, via the UI having the prompt from a user of the computing device, the confirmation to join the speaker mesh network.

5. The method of claim 1, further comprising transmitting one or more sensor readings to a master computing device of the speaker mesh network.

6. The method of claim 5, wherein the one or more sensor readings comprise an audio input at one or more microphones of the computing device.

7. The method of claim 5, wherein the one or more sensor readings comprise a compass reading of the computing device.

8. The method of claim 5, wherein the one or more sensor readings comprise a global positing system (GPS) reading of the computing device.

9. The method of claim 5, wherein the one or more sensor readings comprise a barometric sensor reading of the computing device.

10. The method of claim 5, wherein the one or more sensor readings are used by the master computing device to determine the topology of the speaker mesh network.

11. The method of claim 10, further comprising transmitting updated sensor readings to the master computing device on at periodic time intervals, the updated sensor readings used by the master computing device to update the topology of the speaker mesh network and to send updated stereo sound and audio equalization instructions.

12. The method of claim 1, wherein the stereo setting comprise proportions of audio tracks of the media item to output during the playback of the media item, and wherein the audio equalization settings comprise a proportion of bass and a proportion of treble to apply to the playback of the media item.

13. A system comprising:
    a memory; and
    a processing device coupled to the memory, wherein the processing device is to:
      identifying computing devices to join a speaker mesh network;
      determine a media item to stream to the computing devices;
      transmit a playback synchronization instruction to the computing devices, the playback synchronization instruction to cause playback of the media item to be synchronized at the computing devices at a playback timestamp relative to a clock time;
      receive sensor readings from the computing devices;
      determine a topology of the speaker mesh network based on the received sensor readings; and
      transmit stereo sound and audio equalization instructions to the computing devices to cause stereo settings and audio equalization settings of the computing devices to be adjusted, the stereo sound and audio equalization instructions based on the determined topology of the speaker mesh network.

14. The system of claim 13, wherein a first computing device of the computing devices to join the speaker mesh network is a master computing device of the speaker mesh network.

15. The system of claim 13, wherein the sensor readings comprise at least one of audio input at one or more microphones of the computing devices, compass readings of the computing devices, global positing system (GPS) readings of the computing devices, or barometric sensor readings of the computing devices.

16. The system of claim 13, wherein the stereo sound and audio equalization instructions are different for ones of computing devices.

17. The system of claim 13, wherein the stereo settings comprise proportions of audio tracks of the media item to output during the playback of the media item, and wherein the audio equalization settings comprise a proportion of bass and a proportion of treble to apply to the playback of the media item.

18. The system of claim 13, wherein a server computing device hosting the media item is a master computing device of the speaker mesh network, the server computing device to store the identifying information in a data store.

19. The system of claim 13, wherein the processing device is further to:
    receive updated sensor readings at periodic time intervals;
    update the topology of the speaker mesh network based on the updated sensor readings; and
    transmit updated stereo sound and audio equalization instructions based on the updated topology.

20. A non-transitory machine-readable storage medium storing instructions which, when executed, cause a processing device to perform operations comprising:
    detecting, by the processing device of a computing device, one or more other computing devices within a geographic vicinity of the computing device;

presenting a prompt in a user interface (UI) of the computing device, the prompt to query whether to join a speaker mesh network with the detected one or more other computing devices; and receiving, via the UI having the prompt, the confirmation to join the speaker mesh network;

transmitting the confirmation to join the speaker mesh network to a master computing device of the speaker mesh network;

transmitting one or more sensor readings to the master computing device of the speaker mesh network;

adjusting playback of a media item according to a playback synchronization instruction, wherein the one or more other computing devices in the speaker mesh network provide synchronized playback of the media item according to the playback synchronization instruction; and applying, by the processing device according to a stereo sound and audio equalization instruction, stereo sound and audio equalization settings to the playback of the media item at the computing device.

21. The non-transitory machine-readable storage medium of claim 20, wherein the stereo sound and audio equalization settings at the one or more other computing devices are different than the stereo sound and audio equalization settings at the computing device.

22. The non-transitory machine-readable storage medium of claim 20, wherein the playback synchronization instruction comprises identification of the media item, a timestamp in the media item, and a synchronized clock time.

23. The non-transitory machine-readable storage medium of claim 20, wherein the one or more sensor readings are used by the master computing device to determine a topology of the speaker mesh network.

24. The non-transitory machine-readable storage medium of claim 23, wherein the stereo sound and audio equalization instructions are based on the topology of the speaker mesh network.

* * * * *